US008484451B2

(12) United States Patent
Sibert et al.

(10) Patent No.: US 8,484,451 B2
(45) Date of Patent: Jul. 9, 2013

(54) METHOD AND APPARATUS FOR SOFTWARE BOOT REVOCATION

(75) Inventors: Hervé Sibert, Le Mans (FR); Per Ståhl, Klagshamn (SE)

(73) Assignee: ST-Ericsson SA, Plan-les-Ouates (CH)

(*) Notice: Subject to any disclaimer, the term of this patent is extended or adjusted under 35 U.S.C. 154(b) by 460 days.

(21) Appl. No.: 12/722,046

(22) Filed: Mar. 11, 2010

(65) Prior Publication Data
US 2011/0225409 A1 Sep. 15, 2011

(51) Int. Cl.
*G06F 9/00* (2006.01)
*G06F 9/24* (2006.01)
*G06F 15/177* (2006.01)
*G06F 21/00* (2006.01)
*G06F 12/14* (2006.01)
*G06F 7/04* (2006.01)
*G11C 7/00* (2006.01)

(52) U.S. Cl.
USPC .......... 713/2; 713/1; 713/100; 713/182; 713/189; 726/18; 726/28

(58) Field of Classification Search
None
See application file for complete search history.

(56) References Cited

U.S. PATENT DOCUMENTS

| 5,200,999 | A | 4/1993 | Matyas et al. |
|---|---|---|---|
| 6,026,293 | A | 2/2000 | Osborn |
| 6,851,059 | B1 | 2/2005 | Pfister et al. |
| 7,080,258 | B2 | 7/2006 | Kawasaki et al. |
| 7,281,138 | B1 | 10/2007 | Di Benedetto |
| 7,299,358 | B2* | 11/2007 | Chateau et al. ............... 713/176 |
| 7,350,072 | B2 | 3/2008 | Zimmer et al. |
| 7,543,140 | B2* | 6/2009 | Dillaway et al. ............... 713/156 |
| 7,587,600 | B2 | 9/2009 | Bodensjo et al. |
| 2002/0031222 | A1 | 3/2002 | Buchheit et al. |
| 2003/0014643 | A1 | 1/2003 | Asami et al. |
| 2003/0105956 | A1 | 6/2003 | Ishiguro et al. |

(Continued)

FOREIGN PATENT DOCUMENTS

| CA | 2536610 A1 | 8/2005 |
|---|---|---|
| EP | 1217850 A1 | 6/2002 |

(Continued)

OTHER PUBLICATIONS

Akselrod, D. et al. "Platform Independent Debug Port Controller Architecture with Security Protection for Multi-Processor System-on-Chip ICs." Proceedings of Design, Automation and Test in Europe, 2006 (Date '06), vol. 2, Mar. 6-10, 2006.

(Continued)

*Primary Examiner* — Ji H Bae
(74) *Attorney, Agent, or Firm* — Coats & Bennett, P.L.L.C.

(57) ABSTRACT

A composite customer ID (CCID) is stored in the OTP memory of integrated circuit chipsets used by a number of different customers. The CCID includes individual customer IDs (CIDs) at defined index positions, each corresponding to a different customer. Each chipset allows or disallows software booting, based reading a certificate index value from a given customer's certificate, reading an OTP CID from OTP, as pointed to the by certificate index value, and evaluating the OTP CID with a certificate CID read from the certificate. Thus, while CCID carries information for a plurality of customers, each customer's certificate points only to that customer's OTP CID, which can be changed to revoke that customer's certificate without revoking the other customers' certificates. The CCID also may include a version number, where the chipsets allow or disallow software booting based on evaluating the certificate version number in view of the CCID version number.

16 Claims, 8 Drawing Sheets

U.S. PATENT DOCUMENTS

| | | | |
|---|---|---|---|
| 2003/0206627 A1 | 11/2003 | Penugonda et al. | |
| 2004/0128523 A1 | 7/2004 | Fujioka | |
| 2004/0163013 A1 | 8/2004 | Watt et al. | |
| 2004/0177269 A1 | 9/2004 | Belnet et al. | |
| 2004/0210797 A1 | 10/2004 | Kimelman et al. | |
| 2005/0149729 A1 | 7/2005 | Zimmer et al. | |
| 2005/0193220 A1 | 9/2005 | Little et al. | |
| 2005/0246523 A1 | 11/2005 | Mauro, II et al. | |
| 2005/0268092 A1 | 12/2005 | Shankar et al. | |
| 2006/0129848 A1 | 6/2006 | Paksoy et al. | |
| 2006/0230165 A1 | 10/2006 | Zimmer et al. | |
| 2006/0236111 A1 | 10/2006 | Bodensjo et al. | |
| 2006/0242465 A1 | 10/2006 | Cruzado et al. | |
| 2006/0248393 A1 | 11/2006 | Hatakeyama | |
| 2006/0282734 A1 | 12/2006 | Milne et al. | |
| 2007/0011023 A1 | 1/2007 | Silverbrook | |
| 2007/0118880 A1 | 5/2007 | Mauro, II | |
| 2007/0220337 A1 | 9/2007 | Itoh et al. | |
| 2007/0234068 A1 | 10/2007 | Silverbrook et al. | |
| 2007/0234420 A1 | 10/2007 | Novotney et al. | |
| 2007/0271461 A1 | 11/2007 | Hardy et al. | |
| 2008/0005560 A1 | 1/2008 | Duffus et al. | |
| 2008/0137848 A1 | 6/2008 | Kocher et al. | |
| 2009/0217054 A1 | 8/2009 | Haider et al. | |
| 2009/0276844 A1 | 11/2009 | Gehrmann et al. | |
| 2010/0115465 A1* | 5/2010 | Lu et al. ......................... | 715/810 |

FOREIGN PATENT DOCUMENTS

| | | |
|---|---|---|
| WO | 2005/019974 A2 | 3/2005 |
| WO | 2007/023457 A2 | 3/2007 |
| WO | 2007/062020 A2 | 5/2007 |

OTHER PUBLICATIONS

Gagnon, M. et al. "Software Protection through Anti-Debugging." IEEE Computer Society, IEEE Security & Privacy, 2007, pp. 82-84. Available at: http://ieeexplore.ieee.org/iel5/8013/4218538/04218560.pdf.

Gehrmann, C. et al. "Mobile Platform Security." Ericsson Review, Issue No. 02/2006, 2006. Available at: http://www.ericsson.com/ericsson/corpinfo/publications/review/2006_02/03.shtml.

Giordano, P. "Lockbox Secure Technology on Blackfin Processors." Analog Devices, Blackfin Online Learning & Development, 2007. Available at: http://www.analog.com/processors/pdf/bold/lockbox_secure_technology_transcript.pdf.

Giordano, P. "Lockbox Secure Technology on Blackfin Processors." Analog Devices, Blackfin Online Learning & Development, 2007. Available at: http://www.analog.com/processors/pdf/bold/Lockbox_Secure_Technology_slides.pdf.

Menezes, A.J. et al. "Handbook of Applied Cryptology." Library of Congress Cataloging-in-Publication Data, 1997 CRC Press, Inc., pp. 457-459.

Suh, G. E. "AEGIS: A Single-Chip Secure Processor." thesis paper submitted to the Department of Electrical Engineering and Computer Science at Massachusetts Institute of Technology, Sep. 2005.

Trimberger, Steve, "Trusted Design in FPGAs," http://videos.dac.com/44th/slides/1_2.ppt#303,2, Trusted Design in FPGAs, 26 pages. Mar. 30, 2007.

Discretix embedding security solutions, 2 pages; http://www.discretix.com/CryptoCell/. Date 2007.

* cited by examiner

METHOD AND APPARATUS FOR SOFTWARE BOOT REVOCATION

FIELD OF THE INVENTION

The present invention generally relates to chipsets, such as those providing integrated cellular communication functions, and particularly relates to a method and apparatus for software boot revocation.

BACKGROUND

Current chipsets, such as those used to implement core cellular and other communication standards, are delivered to customers with built-in support for authentication at boot. This means that, upon booting a given chipset, the chipset's firmware checks the authenticity of the initial software (called SW Boot) with respect to, e.g., a cryptographic key, and executes said software only if the check is successful.

However, in a final customer product, the cryptographic key (public key) used during this verification is customer-dependent and usually generated by the customer. In order to avoid production issues (different provisioning between customers and even between chipsets dedicated to different products of the same customer), the public key used by the chipset firmware to check the SW Boot is thus provisioned by the customer—which may be regarded as a "final" customer public key. Usually, the location for provisioning this key is a one-time-programmable (OTP) memory embedded in the chipset.

However, when the final customer public key is not yet provisioned, it is dangerous to allow the execution of a SW Boot that has not been checked in any way. Indeed, allowing execution of an unverified SW Boot opens the door to counterfeiting in cases where empty chipsets are stolen. That is, a counterfeiter could provision empty chipsets with the same data as a legitimate customer, and then run that customer's software. Therefore, there are known integrity checks that are performed for chipsets when the final customer public key is not provisioned yet.

In one example flow, the chipset firmware checks the SW Boot integrity as follows: (1) a customer public key is retrieved from the SW Boot, together with a customer public key certificate; (2) the customer public key certificate is verified with respect to a root key embedded in the firmware, meaning that the customer public key has been validated by the owner of the firmware root key (usually the chipset manufacturer); and (3) if the validation is successful, the customer public key is used to verify the SW Boot. This method allows for controlling the chipsets until they are provisioned with a final customer public key in OTP.

If the customer public key is provisioned in OTP then steps (1) and (2) are omitted and the customer public key used in the verification of the SW Boot in step (3) is obtained from OTP. To save OTP memory, it is possible to store the customer public key as part of the SW Boot and only store the cryptographic hash of the public key in OTP. In this case, an extra step is introduced before step (3) in which the hash of the customer public key obtained from the SW Boot is computed and checked against the stored hash of the customer public key in OTP.

The provisioning of the customer public key (or customer public key hash) can be done only after executing a SW Boot signed by a customer public key, which has been certified by the firmware root key. The SW Boot may then write into the OTP of the chipset the final customer public key (or customer public key hash), which may differ from the one certified by the firmware root key. Therefore, the private part of a customer key (customer private key used to sign the SW Boot, corresponding to the customer public key used to verify it) is especially sensitive. That is, a customer private key can be used to take control of empty chipsets and, therefore, the loss or compromise of such data is a significant security risk.

Indeed, in cases where a customer private key is lost or compromised, it is necessary to protect against unauthorized use of chipsets that are not yet shipped to the compromised customer (or others). A revocation process is used, wherein a verification number is stored by the chipset manufacturer into the chipset OTPs before delivery to any customer. In turn, the verification number is also included in the customer public key certificates of all authorized customers of the chipsets. Such a listing is part of the data items certified by the chipset firmware root key.

More particularly, when checking a customer public key certificate, the chipset firmware also verifies that the number that it reads from its OTP matches one of the numbers present in the customer public key certificate. Unless a match is found, the chipset firmware will not execute the SW Boot. Revocation in this manner works as follows: if a customer private key is lost, then newly produced chipsets are provisioned with a new verification number in OTP that does not match any of the verification numbers contained in the customer public key certificates that are in the possession of the authorized customers of the chipset.

One issue with the above approach is that, if a customer public key is revoked, then a new, not used yet verification number must be provisioned in the chipsets. Adding this new verification number will, as desired, disallow verification with the compromised customer certificate. However, the change also invalidates the other customer certificates, as they will not include the new verification number. Hence, with the loss or compromise of one customer's private key data, it is necessary to re-certify all other customers.

An alternative would be to manage verification numbers or other data for each customer separately. However, doing so requires that chipsets targeted for one customer be loaded with different verification data than those targeted for another customer. These different verification data provisions make the manufacturing and inventory control of chipsets more difficult, particularly when a plurality of customers uses the same type of chipset.

SUMMARY

According to one aspect of the teachings presented herein, a composite customer ID or CCID is stored in the one-time-programmable (OTP) memory of integrated circuit chipsets used by a number of different customers. The CCID includes individual (OTP) CIDs at defined index positions. In turn, individual chipsets are configured, e.g., via their firmware, to read a certificate index value from a given customer's certificate and use the certificate index value to read a particular OTP CID from the CCID. Further, the chipset is configured to allow or disallow software booting of the chipset based on evaluating the OTP CID with a CERT CID read from the customer's certificate.

In this manner, the multi-bit CCID carries information for a plurality of customers, but each given customer's certificate points to the particular subset of bits within the CCID constituting the OTP CID for that given customer. Advantageously, then, the OTP CID values for each customer can be managed by the chipset manufacturer, e.g., changed to revoke a given customer's certificate, without affecting the validity of the other customers' certificates. That is, the CCID implemented according to the teachings herein allows the chipset manufacturer to provision all chipsets of a given type with the same CCID, while still retaining the ability to revoke the certificates of individual customers of that chipset.

Additionally, in at least one embodiment, the CCID includes or is associated with a version number stored in the OTP. Each customer certificate further includes a version number. In such embodiments, the chipset firmware is configured to allow or disallow software booting in dependence on whether the certificate version number is equal to or greater than the OTP version number stored in the chipset. If not, software booting is disallowed. This arrangement allows a given customer to be issued a newer version of certificate that allows software booting of chipsets that include the older version of the CCID, and chipsets that include the newer, matching version of the CCID.

Of course, the present invention is not limited to the above brief summary of features and advantages. Those skilled in the art will appreciate additional features and advantages upon reading the following description of example embodiments, and upon viewing the accompanying drawings.

DETAILED DESCRIPTION

Figure 1:
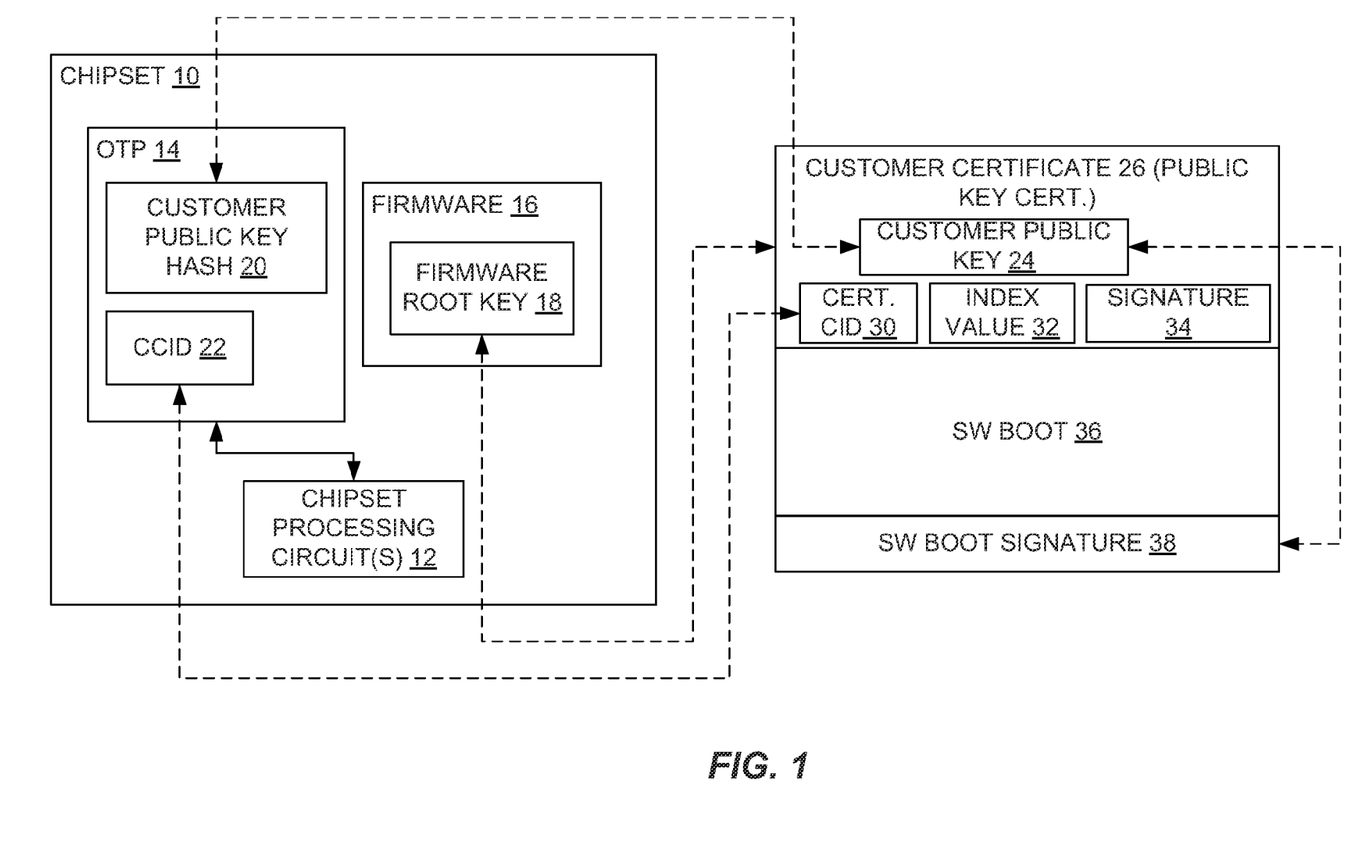
FIG. 1 is a block diagram of one embodiment of a chipset, shown in association with the data structure and contents of an example customer certificate.

FIG. 1 illustrates one embodiment of a chipset 10, which is configured to implement a method of software boot revocation as taught herein. Stored firmware or other computer program instructions stored in a non-volatile computer readable medium implement the desired configuration of the chipset 10, via execution of those instructions by one or more chipset processing circuits 12. In one non-limiting example, the chipset processing circuits 12 comprise a microprocessor and its supporting circuitry, e.g., timing, reset, and interface circuits.

Of particular interest with respect to the desired software boot revocation control, FIG. 1 depicts the chipset 10 as including one-time-programmable (OTP) memory 14 and firmware 16, including a firmware root key 18. The firmware 16 comprises, for example, computer program instructions stored in non-volatile memory included within the chipset 10.

As for the OTP memory 14, the "OTP" designation stems from the physical structure of the OTP memory 14, wherein any given bit within the OTP 14 can be programmed only once, and is thereafter unchangeable. Although it depends on the structure of the OTP 14, as an example, all bits in the OTP 14 initially are logical 0s and programming the OTP 14 comprises setting selected bits within the OTP 14 to logical 1s. Depending on the involved OTP memory technology, different OTP bits can be changed from 0 to 1 in different programming sessions or a number of bits is selected and programmed in one programming session and further programming is not possible. In the case several programming sessions are possible, one or more lock bits are typically present and can be programmed to prevent any further programming of different regions of the OTP, thereby preventing the programming of un-programmed bits in any of the locked regions. As OTP memories are well understood in the art, further OTP details are omitted.

The depicted OTP memory 14 stores a customer public key hash 20 and a "composite customer ID" (CCID) 22. In this context, the OTP area is realized such that separate programming of the customer public key hash and the CCID is possible at different programming sessions (at different points in time), because the customer public key hash is programmed by the customer and the CCID is programmed by the device manufacturer. However, individual bits within the customer public key hash field and the CCID field may not be programmable at different programming sessions, depending on the OTP technology used. In any case, according to the nomenclature herein, a particular "CID" serves as a customer-specific identifier and the CCID 22 serves as a composite data structure containing a number of CIDs.

FIG. 1 depicts additional electronic data structures or values, including: a customer certificate 26 (including a customer public key 24, a certificate or CERT CID 30, a certificate or CERT index value 32, and a signature 34), software boot 36, and a software boot signature 38. These additional values may be stored or otherwise loaded into memory, such as RAM, that is accessible to the chipset 10. This additional memory may be, for example, included in the device in which the chipset 10 is installed, or may be included in test-bench memory. (Those skilled in the art will appreciate that the customer certificate 26 is, for example, an electronic "document" that uses a digital signature to bind together a public key with an identity, for authentication).

Figure 2:
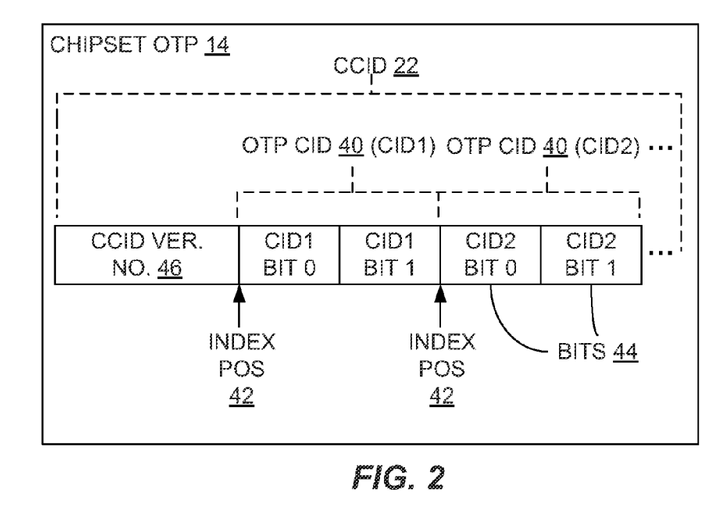
FIG. 2 is a block diagram of an example arrangement for the one-time-programmable memory of the chipset of FIG. 1.

According to the example of FIG. 2, the CCID 22 comprises a multi-bit value having two or more CIDs 40, each such CID 40 referred to as an "OTP" CID 40, to clarify that it is held in the OTP memory 14 of a chipset 10. The OTP CIDs 40 are contained at customer-specific index positions 42 within the multi-bit CCID 22. Each OTP CID 40 comprises one or more (OTP) bits 44. In this manner, the CCID 22 can be managed as one overall composite value, but it may be indexed into at particular index positions, to obtain the customer-specific OTP CIDs 40 of corresponding individual customers.

While contiguous OTP bits 44 may be advantageous for allocation to the CCID 22, to simplify indexing into the CCID 22, contiguous allocation is not necessary. Also, it should be understood that different CIDs can be defined as having different lengths. For example, the CIDs used for one customer may have a length of two bits, while the CIDs used for another customer may have a length of four bits.

The disclosed CCID arrangement advantageously permits each OTP CID 40 to be managed separately, for each customer of the chipset 10, while still maintaining the convenience of having an overall CCID 22 for the (potential) plurality of customers that purchase chipsets 10 of the same type, for use with their own respective devices and software. Further, in at least one embodiment taught herein, the CCID 22 includes or is associated with a CCID version number 46. As will be seen in non-limiting examples presented later herein, use of the CCID version number 46 provides additional flexibility and convenience when managing and/or assessing the revocation status of different customer certificates 26, for different customers of the chipset 10.

Figure 3:
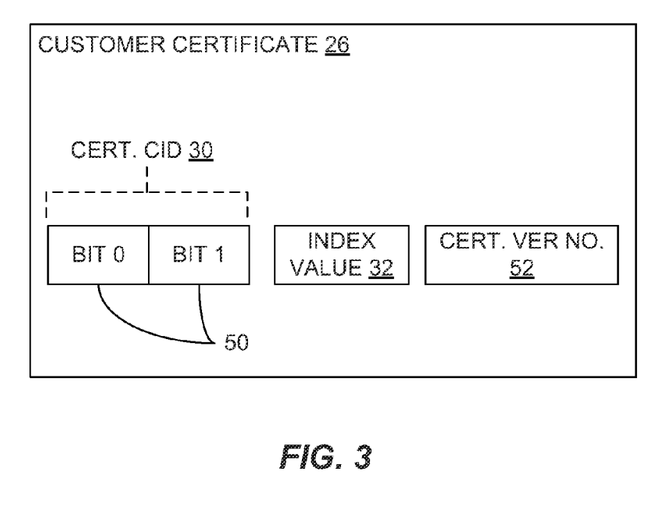
FIG. 3 is a diagram of a more detailed example for data items within a customer certificate.

FIG. 3 depicts an example embodiment of a given customer certificate 26, which may be understood as customer-specific information embodied in a secure/authenticated electronic data structure uniquely associated with a given customer of the chipset 10. (The manufacturer of the chipset 10 may issue customer certificates 26 and/or may cooperate with a third-party certificate authority, via secure communications/databases, to issue appropriately configured customer certificates 26.) In any case, as a non-limiting but advantageous example, the illustrated customer certificate 26 includes the previously illustrated CERT CID 30, which includes a number of bits 50.

In general, the CERT CID 30 in any given customer certificate 26 includes the same number of bits 50 as included in the corresponding OTP CID 40 in the CCID 22. The CERT index value 32, as stored in any given customer certificate 26, "points" to the OTP CID 40 in the CCID 22 that is associated with that particular customer certificate 26. Thus, the number of bits 50 in the CERT CID 30 contained in a given customer's certificate 26 generally equals the number of OTP bits 44 in the corresponding OTP CID 40, as pointed to by the CERT index value 32. This configuration allows the pattern and/or value of bits 44 in the corresponding OTP CID 40 to be evaluated with respect to the pattern and/or value of bits 50 in the CERT CID 30, for determining the revocation status of the customer certificate 26. One also sees that if a CCID version number 46 is used, the customer certificate 26 also includes a certificate or CERT version number 52. Version number comparisons thus may be used for determining the revocation status of any given customer certificate 26.

Figure 4:
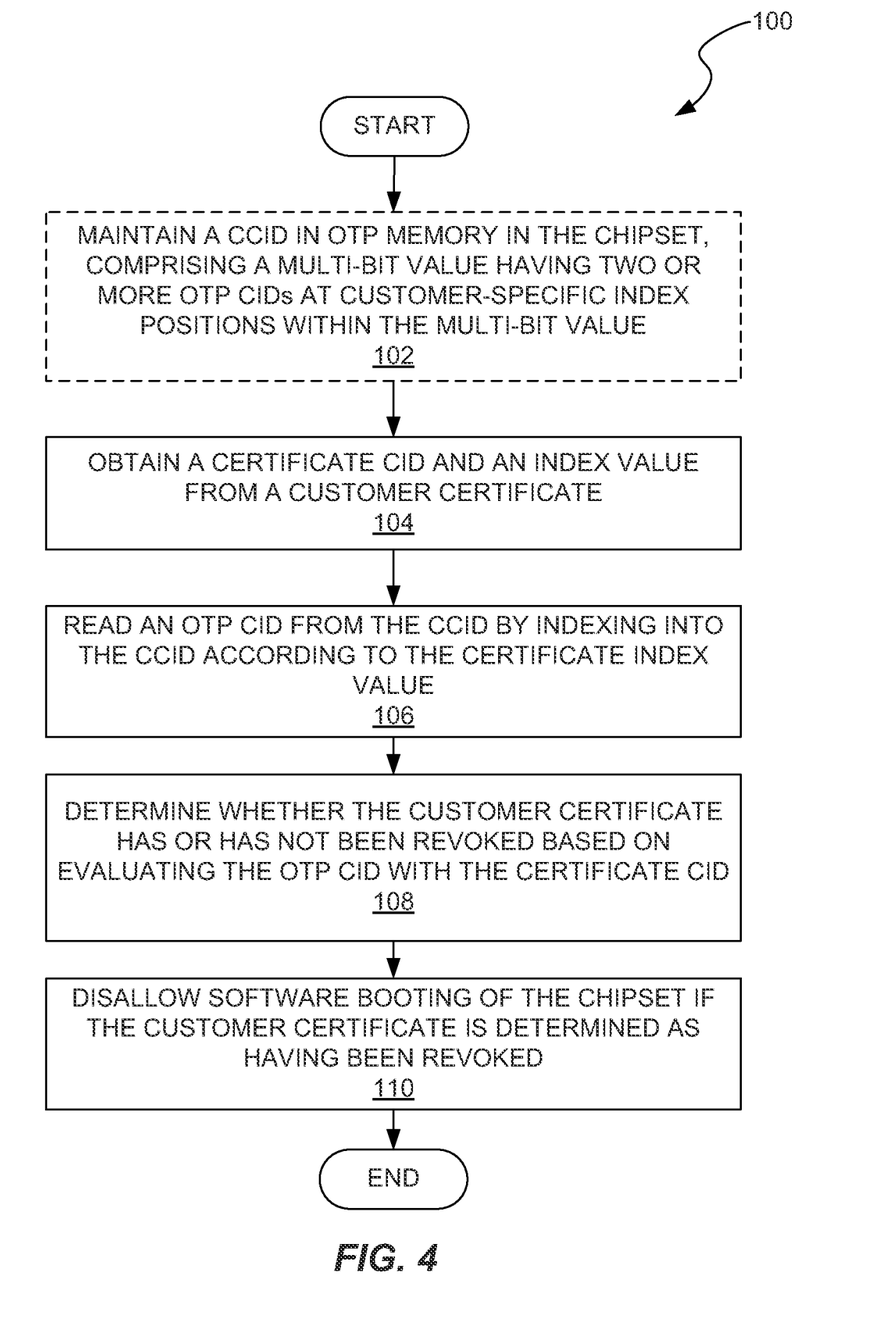
FIG. 4 is a logic flow diagram of one embodiment of a method implemented in a chipset, e.g., firmware programming, for determining whether a given customer certificate is or is not revoked.

In exploiting the above defined values, the one or more processing circuits 12 of each chipset 10 are configured to carry out a software boot revocation method 100, an embodiment of which is depicted in FIG. 4. (As noted, the method 100 may be implemented via computer program instructions included in the firmware 16, stored in the OTP 14.)

The illustrated method 100 assumes that a CCID 22 is maintained (stored) in the OTP memory 14 of the chipset 10 and that the CCID 22 comprises a multi-bit value having two or more OTP CIDs 40 at customer-specific index positions 42 within the multi-bit value (Step 102). The processing further assumes that the software boot revocation method 100 relates to a particular customer certificate 26, which is to be determined by the chipset 10 as "revoked," in which case software booting of the chipset 10 is disallowed, or as "not revoked," in which case software booting is permitted.

Accordingly, the processing of the method 100 includes the chipset 10 obtaining a CERT CID 30 from a given customer certificate 26, and further obtaining the CERT index value 32 from the customer certificate 26 (Step 104). Further processing then includes reading an OTP CID 40 from the CCID 22, by indexing into the CCID 22 according to the CERT index value 32 (Step 106), such that the correct, customer-specific OTP CID 40 is read from the CCID 22. That OTP CID 40 begins at the index position 42 pointed to by the CERT index value 32.

Still further, the method 100 includes the chipset 10 determining whether or not the customer certificate 26 has been revoked, based on evaluating the OTP CID 40 with the CERT CID 30 (Step 108). In keeping with the objective of preventing unauthorized booting of software for the chipset 10, software booting of the chipset 10 is disallowed, if the customer certificate 26 is determined as having been revoked (Step 110).

In at least one embodiment of the above processing, the chipset 10 is configured to read the OTP CID 40 based on reading a predefined number of bits 44 (as shown in FIG. 2) from the CCID 22. The predefined number of bits 44 is read starting (or ending) at an index position 42 corresponding to the CERT index value 32, according to a known bit length used for representing OTP CIDs 40 within the CCID.

To better understand such usage of OTP CIDs 40 within the CCID 22, assume the OTP technology in use for the OTP memory 14 allows individual bits to be changed from 0 to 1, but not back to 0. Until the OTP memory lock bit is programmed, a given two-bit OTP CID 40 in a given chipset 10 can be electronically updated from its initial (default or starting) value of 00 to the 01 or the 10 value. If the OTP CID 40 in a given chipset 10 has already been changed to the value and the OTP lock bit (or bits) protecting the CCID area of the OTP has not yet been programmed, it can be updated to the 11 value. Likewise, the 01 value can be updated to the 11 value. However, once the value 11 is programmed into the OTP bits 44 within the two-bit OTP CID 40, the value cannot be further updated independently, regardless of whether the OTP area is locked or not. Thus, the 11 value can be considered the maximum value that a two-bit OTP CID 40 can take on for the example type of OTP memory 14. (Of course, other bit lengths may be defined for OTP CIDs 40, as needed or desired.)

In at least one embodiment, the value of the CERT CID 30 in any given customer certificate 26 is not permitted to take on the maximum value possible within the corresponding OTP CID 40, as this would result in a value for the CERT CID 30 which could not be revoked according to certain processing methods presented herein. In this sense, the OTP CID 40 for a given customer can be set to the maximum all-1s value as an indication that the customer's certificate 26 is revoked—i.e., the maximum possible value for any given OTP CID 40 can serve as a revocation indicator or "revocation" value. Thus, in at least one embodiment, the OTP CID 40 of a given customer is set to the maximum possible OTP value. That maximum setting serves as an indication that the customer's certificate 26 is revoked, and the certificate issuance processing logic is configured to disallow issuance of customer certificates 26 with CERT CIDs 30 having the maximum possible OTP value.

With the above approach, a new certificate 26 cannot be issued to a customer where the corresponding value of the OTP CID 40 for that customer has reached its maximum, unless the programming value for the CCID version number 46 is increased. In conjunction with updating the CCID version number 46, the "programming values" for all OTP CIDs 40 within the CCID 22 are reset, such that new chipsets 10 are produced with the updated CCID version number 46 and reset OTP CIDs 40. Here, the term "programming values" connotes the programmatic values used by the manufacturing (or provisioning) equipment used by the chipset manufacturer generally, which are used to program values into the OTP 14 of chipsets 10 (e.g., the CCID 22). Thus, "resetting" the OTP CID 40 for a given customer entails resetting the value used to program that particular OTP CID 40. If the OTP lock bit(s) is not programmed, it is possible to update an already-programmed OTP CID 40 (up to the maximum value described above), but it is not possible to "reset" OTP bits 44 within the OTP memory 14.

In any case, in at least one embodiment of the method 100, the chipset 10 is configured to evaluate the OTP CID 40 to determine whether it equals a defined revocation value. If the OTP CID 40 equals the defined revocation value, the chipset 10 deems the customer certificate 26 to have been revoked. On the other hand, if the OTP CID 40 pointed to by the CERT index value 32 does not equal the revocation value, the chipset 10 is configured to evaluate the OTP CID 40 with the CERT CID 30, to determine whether the customer certificate 26 is or is not revoked. In one embodiment, if the CERT CID 30 is greater than or equal to the OTP CID 40, the chipset 10 deems the customer certificate 26 as being not revoked. Conversely, the chipset 10 deems the customer certificate 26 as being revoked, if the CERT CID 30 is less than the OTP CID 40.

Figure 5:
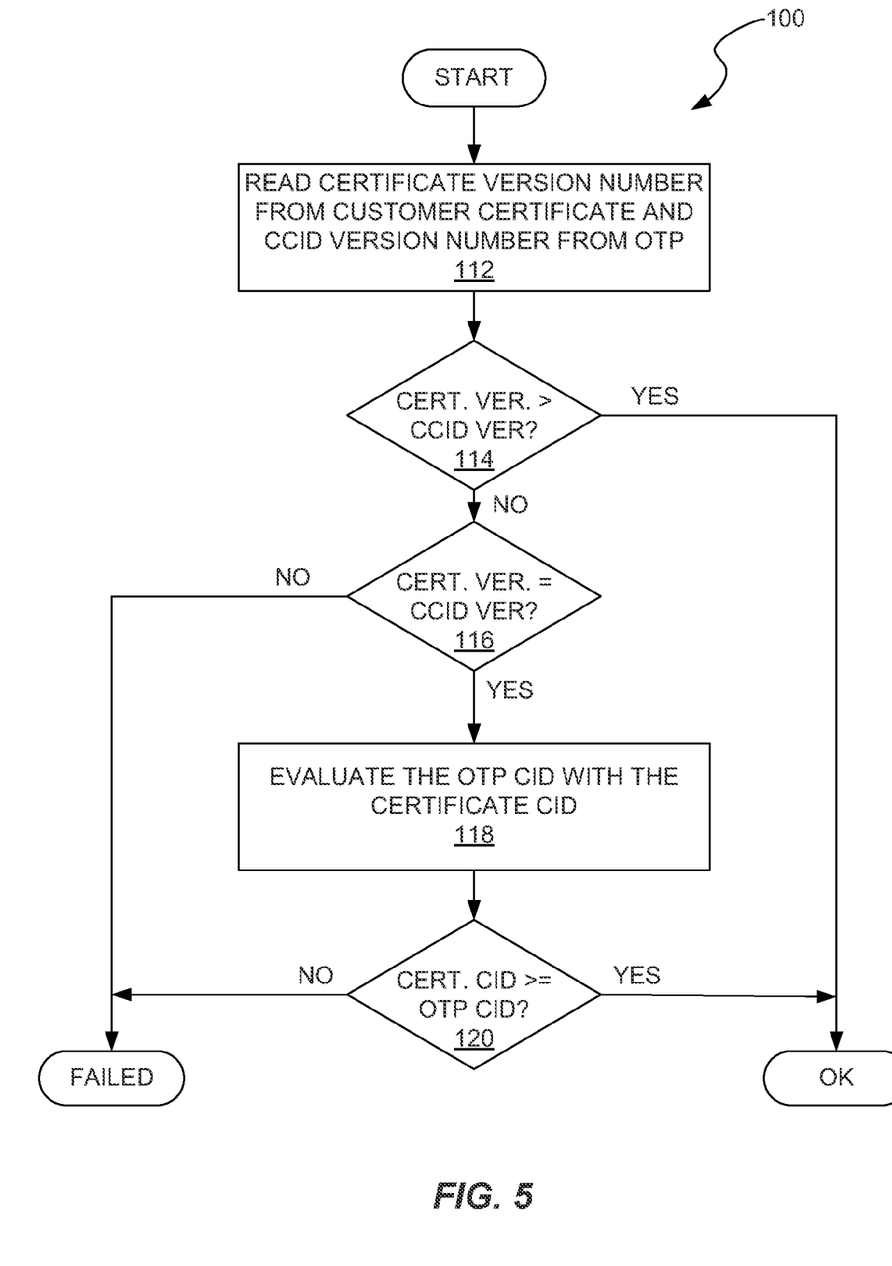
FIG. 5 is a logic flow diagram of another embodiment of a method implemented in a chipset, e.g., firmware programming, for determining whether a given customer certificate is or is not revoked.

Determination of customer certificate revocation status may be made more sophisticated (and more flexible with respect to the overall group of customers) though the use of the version numbers shown in FIGS. 2 and 3. FIG. 5 provides a more detailed depiction of the method 100, as implemented in at least one embodiment that uses version numbers. In particular, FIG. 5 extends the example of FIG. 4 by depicting use of a CCID version number 46 in comparison with CERT version number 52, as part of the method 100. Note the processing of FIG. 5 would be performed after any initial verification checks, such as verifying that the certificate 26 and its included information are valid.

Here, processing begins with reading the CERT version number 32 from the customer certificate 26 being checked (Step 112). Next, the chipset 10 compares the CERT version number 52 to the CCID version number 46 (Step 114). If the CERT version number 52 is greater than the CCID version number 46, this indicates that the customer has been issued a new customer certificate 26, which takes precedence over the chipset version, as denoted by the CCID version number 46, for which software booting is desired.

Of course, the overall authentication checks, including signature verifications/hashing, etc., all must be satisfied before software booting is permitted. The point here is that the OTP CID versus CERT CID checking can be skipped, if the CERT version number 52 is newer than the CCID version number 46. One advantage of this arrangement is that a customer that has an authenticated customer certificate 26 can use newer chipsets 10 in which the CCID version number 46 has been updated to the value included in the customer certificate 26, and can continue using remaining supplies of the chipset 10 that were programmed with an older (lesser) CCID version number 46.

On the other hand, if the CERT version number 52 is not greater than the CCID version number 46 (No from Step 114), then processing continues with determining whether the CERT version number 52 equals the CCID version number 46 (Step 116). If not, the evaluation is considered as having failed, meaning that the customer certificate 26 is deemed as revoked.

If the CERT version number 52 equals the CCID version number 46 (Yes from Step 116), then processing continues with evaluating the OTP CID 40 with the CERT CID 30 (Step 118). (That is, the OTP CID 40 for this particular customer certificate 26 is read from the CCID 22 according to the index position 42 identified by the CERT index value 32 included in the customer certificate 26.) If the CERT CID 30 is greater than or equal to the OTP CID 40, then the customer certificate 26 is deemed as not being revoked (Yes from Step 120). Otherwise, the customer certificate 26 is deemed as being revoked (No from Step 120). A further advantage here is that authenticated customer certificate 26 can use newer chipsets 10 in which the OTP CID 40 for this particular customer has been updated to the value included in the customer certificate 26, and can continue using remaining supplies of the chipset 10 that were programmed with an older (lesser) OTP CID version number 46 for this particular customer.

Thus, in one or more embodiments of the chipset 10 the OTP 14 stores a CCID version number 46. For version number checking, the chipset 10 is configured to deem a given customer certificate 26 as being revoked, if a CERT version number 52 stored in the customer certificate 26 is less than the CCID version number 46 stored in the OTP 14. Further, in at least one such embodiment, the chipset 10 is configured to deem the customer certificate 26 as being not revoked, without need for evaluating the OTP CID 40 with the CERT CID 30, if the CERT version number 52 is greater than the CCID version number 46. Finally, if the CERT version number 52 is equal to the CCID version number 46, the chipset 10 is configured to evaluate the OTP CID 40 with the CERT CID 30 and deem the customer certificate 26 as being revoked if the CERT CID 30 is less than the OTP CID 40.

In a describing a variation of the contemplated processing, one may indicate concatenation by the "|" operator an express the CCID 22 as a concatenation of CCID version number 46 and the OTP CIDs 40. Thus, the CCID 22 equals [version|CID1|CID2|CID3| . . . |CIDn], and the concatenation of the CCID version number 46 with the OTP CID 40 for the k-th customer as [version|CIDk]. Correspondingly, using the accent mark, one may express the CERT version number 52 and the CERT CID 30 from the k-th customer certificate 26 as [version'|CID'k].

Any given chipset 10 can be configured—e.g., via firmware programming—to verify the k-th customer certificate 26 by verifying that the number [version'|CID'k] from the customer certificate 26 is greater than or equal to [version|CIDk] from the CCID 22 in the OTP memory 14. As suggested before, there may be disallowed values defined for the CCID version number 46. For example, the value [version'|CID"k] equals all 1s being forbidden with respect to customer certificates 26 and/or [version|CIDk] equals all 1s in the OTP memory 14 indicating definitively that the k-th customer has been forbidden.

Thus, the method 100 illustrated in FIG. 4 can be modified as follows. First, the chipset 10 checks whether [version|CIDk] equals all 1s. If so, the customer certificate 26 for the k-th customer is deemed to have been revoked. Next, the chipset 10 then checks whether version'>version. If so, then the customer certificate 26 is deemed as being not revoked. (Of course, those skilled in the art will appreciate that revocation status determination processing does not even reach this point if the certificate 26 fails initial authentication checks.) On the other hand, if version'<version, then the chipset 10 deems the customer certificate 26 as being revoked. Or, if version' equals version, then the chipset 10 goes on to determine whether the customer certificate 26 has been revoked, based on the evaluation of CIDk and CID'k, or on the evaluation of [version|CIDk] with [version'|CID'k] (as shown in Step 108 of FIG. 4). For example, the chipset 10 deems the customer certificate 26 as having been revoked unless [version'|CID'k] is greater than or equal to [version|CID].

In all such operations, the chipset 10 can be configured to read and process values from the OTP 14 and the customer certificate 26 as binary values, or as count values equal to the number of 1s bits (or 0s bits, if opposite logic is used). The choice depends on whether the OTP area for the CCID is locked at chipset manufacturing (either explicitly locked by programming a lock bit or implicitly locked due to the fact that the OTP technology only allows one programming session). Reading as count values rather than as binary values has the disadvantage of, for a given number of bits, offering fewer unique values (e.g., if the CID is encoded using n bits, then there are n−1 "count" values available, for defining different CIDs for different customers). However, count-based processing has an advantage if the OTP area for the CCID is not locked when programmed the first time. In such cases, the count-based approach allows that existing chipsets 10, such as those held in manufacturing inventory, can be updated to revoke a given current customer certificate 26 before being shipped to the customer.

There are many other possible variants for reading and processing fields read from the OTP 14 and any given customer certificate 26. For example, setting an OTP CID 40 value of all 1s for the k-th customer can mean that the k-th customer is forbidden, no matter what the version number is. This approach also allows for updating an existing CCID 22 already written into existing chipsets 10. For example, there may be a batch of chipsets 10 in which the k-th customer's corresponding OTP CID 40 is within the allowed value range. To disallow that customer, these preexisting chipsets 10 can be updated to carry the all-1s value in that customer's OTP CID 40. One point to note here is that, whether a field is read as a binary value or a count value, setting a bit from 0 to 1 increases the value, so that the new number is bigger than the old one.

Regardless of the particular manner used for interpreting and processing OTP CIDs 40, CERT CIDs 30, etc., the software boot revocation method 100 should be understood as a way to modify the handling of CCIDs 22 in such a way that, in case of revocation of a customer public key 24/customer certificate 26, it is not necessary to issue new certificates 26 to customers other than the one who owns the revoked key. Further, this revocation method allows the customer certificate 26 of a particular chipset customer to be revoked, while not having to provision the chipsets 10 with wholly different CCIDs 22 for different customers. That is, with the segmented CCID 22, which has different subsets of bits for different OTP CIDs 40, each corresponding to a different customer, the OTP CID 40 of one customer can be changed, which changes the overall value of the CCID 22, but impacts only the targeted customer certificate 26.

In implementing the method 100, the firmware implementation of the chipset 10 is modified so that, for a given customer certificate 26, the chipset 10 checks whether the OTP CID 40 pointed to by the CERT index value 52 in the certificate 26 and the CERT CID 30 satisfy some equation. In this regard, individual OTP CIDs 40 can be represented in the CCID 22 using any given number of OTP bits 44, from one bit per customer, to multi-bit subsets of OTP bits 44 within the CCID 22 for each customer. As another example of the method 100, consider three customers A, B, C and a 4-bit OTP CID 40 for each such customer.

Further, assume that A's customer certificate 26 includes a CERT index value 32 containing index value 0. Similarly, B's customer certificate 26 includes a CERT index value 32 containing index value 1, and C's customer certificate 26 includes a CERT index value 32 containing index value 2. Further, for an initial run of chipsets 10, one may assume that the CCID 22 is initialized to all 0s (for OTP CIDs 40, for the three customers A, B, and C). Denoting OTP CID 40 for customer A as OTP CIDA, and with similar designations for customers B and C, the initial bit pattern for (CIDA CIDB CIDC) is 0000, where the leftmost bit is index position 0 and the rightmost bit is index position 3 (index position 3 is unused initially).

In case the private key of customer B is lost or otherwise compromised, the revocation of B's customer certificate 26 is done by setting the CCID 22 in any newly manufactured or issued chipsets 10 to 0100. Hence, the certificates 26 of A and C are still working both on old and new chipsets 10. Customer B may request certification of a new key/customer certificate 26. In this case, the chipset manufacturer would dedicate bit 4 at index position 3 to B and provide B with a new customer certificate 26 that contains index 3 as the value in the CERT index value 32. This arrangement would allow customer B to use the newly issued certificate 26 to perform software boot authentication for chipsets 10 that have the old or new CCID values.

It is possible to extend this idea by dedicating a set of bits 44 in the CCID 22 to each customer, instead of a single bit—i.e., one may configure the CCID 22 to include multi-bit OTP CIDs 40. In such cases, the bits 44 of a given OTP CID 40 represent a binary value or count, and the chipset processing circuits 12 check that the value present in the customer certificate 26 is greater than or equal to the value represented in the OTP CID 40 read from the OTP 14 at the index position 42 pointed to by the CERT index value 32 in the customer certificate 26. When all the bits of the OTP CID 40 for a given customer are set to 1, as noted, this can be interpreted as a disallowed value that indicates that the corresponding customer is forbidden.

As another example, consider three customers A, B, and C, and two-bit OTP CIDs 40 in the CCID 22. A's customer certificate 26 points to index position 0 in the CCID 22, and OTP CIDA initially contains 00. Continuing, B's customer certificate 26 points to index position 2, and OTP CIDB in the CCID 22 initially contains 00. Further, C's customer certificate 26 points to index position 4 and the OTP CIDC in the CCID 22 initially contains 00. Assume binary values are used. In case the customer private key of B is lost or compromised, B's current customer certificate 26 is revoked by setting OTP CIDB to 01 in newly produced or issued chipsets. Taking the three OTP CIDs 40 for the three customers together, the new bit pattern in the CCID 22 for the newly produced or issued chipsets is 00010000.

As such, the certificates 26 of customers A and C continue working with no modifications or updates needed, but B's old certificate 26 can no longer be used for booting chipsets 10 that include the updated CCID 22 in their OTPs 14.

As before, B may request the certification of a new key. In this case, the chipset manufacturer would provide B with a new certificate 26 containing index 2 and value 01. Assume now that A loses its private key. The CCID 22 in new chipsets 10 will be updated to 01010000 in order to revoke A's certificate. A may also get a new certificate 26, with the same index value of 0 and but with an updated CID value of 01. If A loses its new private key corresponding to the new certificate, the CCID 22 for new chipsets 10 will be updated to 10010000. As before, A may get a new certificate 26 with index 0 and value 10 certifying yet another new key.

However, if A again loses its new private key, the CCID 22 will be set to 11010000, thus meaning customer A is forbidden (in embodiments where all 1s for an OTP CID 40 denotes the forbidden or revocation value). In this case, the next new certificate 26 issued to A will essentially treat A as a new customer. That is, the spare (unused) two bits of the CCID 22 will now be used to carry the OTP CID 40 used for A, and the CERT index value 32 in A's new customer certificate 26 will be set to index value 6. As this is a newly initialized OTP CID 40, the bits 44 in OTP will be set to 00, and the CERT CID 30 in A's newly issued customer certificate 26 will likewise be set to 00.

Of course, as shown in FIG. 5, the above scheme can be extended by the use of version numbers—e.g., the addition of a CCID version number 46 to the CCID 22 and the addition of a CERT version number 52 to the customer certificates 26. One of the advantages of using version numbers is that a new CCID version number can be used whenever there are no more bits 44 in the CCID 22 for use in creating new or revised OTP CIDs 40.

Thus, when a given customer has exhausted all of the allowed or available bit combinations, the CCID version number 46 can be incremented and all OTP CIDs 40 can be reset to all 0s for the CCID 22 programmed into any newly manufactured chipsets 10.

In other words, when the chipset manufacturer begins releasing chipsets 10 with an incremented CCID version number 46, all customers must obtain new certificates 26 that include a correspondingly updated CERT version number 52. This will be understood from the earlier illustrated logic, wherein software booting is not permitted in cases where the CCID version number 46 is greater than the CERT version number 52 of the customer certificate 26 being authenticated.

As an example of version number-based processing, consider two customers A and B, with five bits 44 in the CCID 22. Four of the bits are dedicated for carrying the OTP CIDA and OTP CIDB as two bits each, with the one remaining bit used as the CCID version number 46. Binary values are used. Customer A's initial customer certificate 26 contains a CERT index value 32 set to 0 and with a CERT CID 30 set to 00. Similarly, B's CERT CID 30 would be set to 00, but B's CERT index value 32 will point to index position 2.

In case B loses its private key, the revocation of B's customer certificate 26 is done by setting the bits for OTP CIDA and CIDB in new chipsets 10 to 00010. Hence, A's certificate 26 continues working, with no need for reissuing. However, the change means that B's old certificate 26 will not work as the CERT CID 30 included in the old certificate 26 is set to 00, which is less than the OTP CIDB in the updated CCID 22 of the new chipsets 10. Of course, B may request certification of a new key 24/certificate 26.

In this case, the chipset manufacturer would provide B with a new certificate 26 containing index 2 and a CID 30 having a value 01. If B subsequently loses the new private key corresponding to this newly issued certificate 26, the CCID 22 will be set to 00100 and B may get a new certificate 26 with index 0 and value 10 certifying yet another key. If B loses again his new private key the CCID will be set to 00110 in newly produced chipsets, thus meaning customer B is forbidden. If B requests a new certificate 26, then the CCID will be changed to 00001 in newly produced chipsets. That is, the OTP CID 40 used for B in the CCID 22 is reset to 00, but the CCID version number 46 is changed from 0 to 1. B's new certificate 26 is updated accordingly, and it is further necessary to issue a new certificate 26 to A, because A's old certificate 26 has a CERT version number 52 that is less than the CCID version number 46 that is being written into the new chipsets 10. These new customer certificates 26 will work on chipsets 10 having the same CCID version numbers 46, and on older chipsets 10 that have a lower CCID version number 46. However, no older certificates 26 can be used with the new chipsets 10.

The above examples, while non-limiting, do highlight some of the advantages of the software boot revocation method 100, and correspondingly configured chipsets 10. As one advantage, the revocation of a customer public key 24/customer certificate 26 for a given customer does not affect the other customers represented in the CCID 22 of the chipsets 10 (unless a CCID version number 46 is used and affected by the change). Another advantage is that customer certificates 26 do not have to include any listing of available or possible IDs; rather, each customer certificate 26 need only carry a pointer to the location of that customer's OTP CID 40 within the CCID 22, and a value for comparison to that OTP CID 40.

One further advantage of the solution is that, if some chipsets 10 have already been produced and are expected for delivery, and, if the CCID 22 has already been set in these chipsets 10, there is nonetheless an opportunity to update the CCIDs 22 in these chipsets 10, to revoke the customer certificate 26 of a particular one or more customers represented in the CCID 22. This requires that the OTP is not explicitly locked for further programming and allows several programming sessions. Additionally, if a customer receives some chipsets 10 for which the customer has not chosen yet a final public key 24, the customer can nonetheless prevent competitors from using the received chipsets 10 by setting all the OTP CID bits corresponding to those competitors to 1.

Yet another advantage is realized in the context of "ModelIDs," as are sometimes used in chipsets. A ModelID value can be included in the CCID 22, although ModelID information is not correspondingly included in the customer certificates 26. Instead, the SWBoot 36 (shown in FIG. 1) is signed with the final customer key. The SWBoot 36 will run on any given chipset 10 only if it is verified successfully using the provisioned final customer public key, and if it embeds a list of ModelIDs that contains the ModelID present in the CCID 22 in the OTP 14 of the chipset 10.

Thus, in a fashion like that presented herein for revoking customer certificates 26, a given customer can revoke a particular SWBoot binary (for instance, because it contains a bug) from running on new products using a given chipset 10, while still allowing other SWBoot binaries to run on both old and new products based on this given chipset 10. This selective revocation is advantageously permitted without need for recertifying these other SWBoot binaries.

Figure 6:
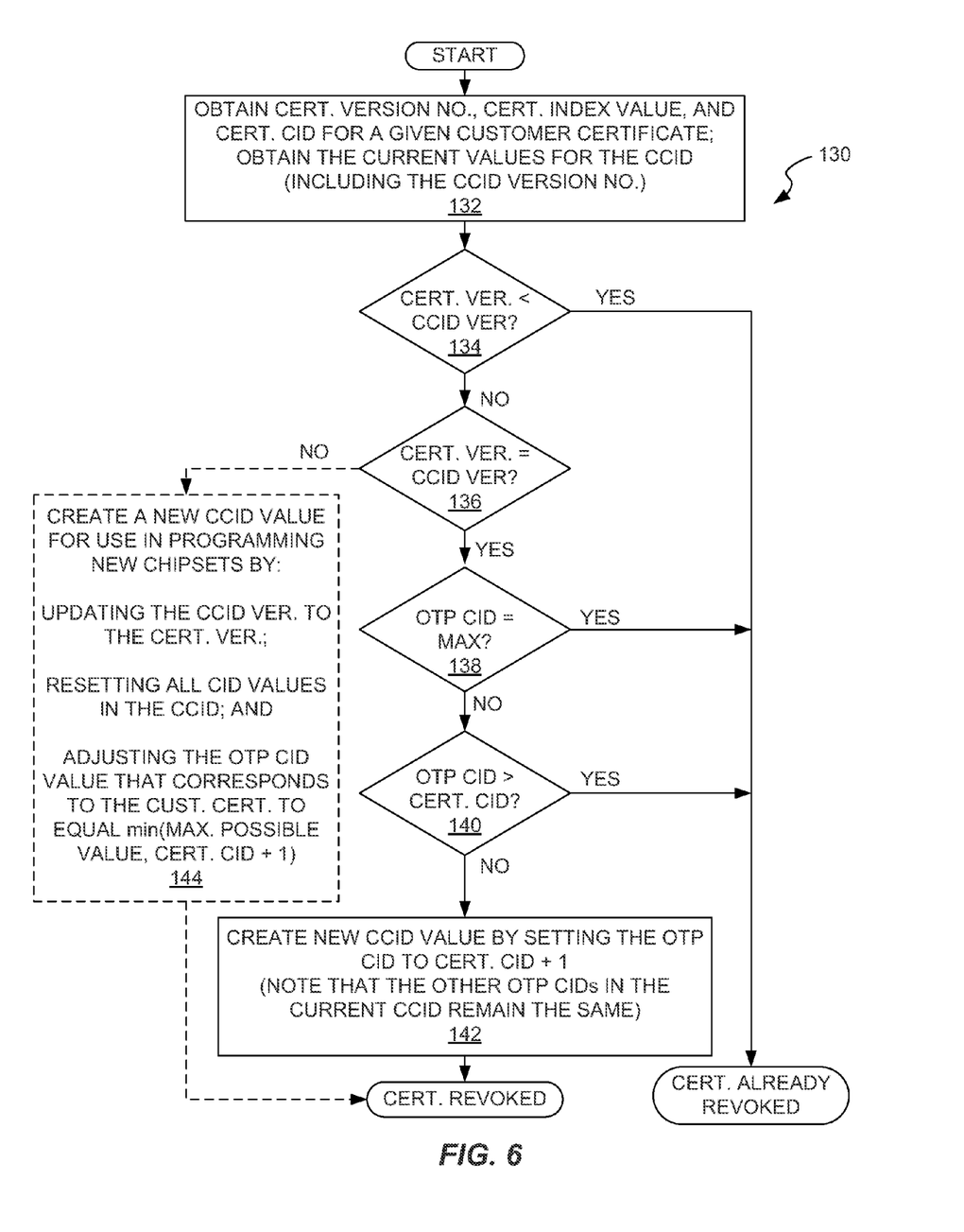
FIG. 6 is a logic flow diagram of an embodiment of a method implemented, e.g., by a chipset manufacturer's computer system, for handling certificate revocation, including CCID updating.

Turning to an example revocation method, as might be used by a chipset manufacturer, FIG. 6 illustrates a method 130 that is implemented on a computer system owned or controlled by the chipset manufacturer, for example. For a current version of CCID 22 being programmed into chipsets 22, the processing of FIG. 6 begins with obtaining the current programming values for the CCID 22, including the CCID version number 46. Additionally, values are obtained for the customer certificate 26 being revoked, the CERT version number 52, the CERT index value 32, and the CERT CID 30 (Step 132). (These may be read from a secure list of customer certificates 26, for example.)

If the CERT version number 52 is less than the current value of the CCID version number 46, then the customer certificate 26 is already revoked and processing ends (Yes from Step 134). As a next check (following the "No" from Step 134), the manufacturer's computer system determines whether the CERT version number 52 has a value equal to that of the current value of the CCID version number 46 (Step 136).

Because the manufacturer maintains the programming values used to set the CCID 22 (including the CCID version number 46), and the disclosed certificate issuance procedures should not permit issuance of a customer certificate 26 with a CERT version number 52 that is larger than the chipset manufacturer's reference value for the CCID version number 46. However, processing should not normally result in traversing the "NO" path from Step 136, the processing of Step 144 may be used to handle that situation. The example processing of Step 144 updates the current manufacturing value for the CCID version number 46 to that of the CERT version number 52.

Doing so effectively revokes the customer certificates 26 of all other customers. Further, to revoke this particular customer's certificate 26, the manufacturing value of the OTP CID 40 corresponding to the customer is updated to the lesser of the CERT CID 30+1, or the maximum OTP value (e.g., the all-1s value). This action ensures traversal of the "No" path from Step 120 in FIG. 5, in the context of a given chipset 10 performing software boot authentication processing according to the details of that flow. Finally, Step 144 indicates that the programming values to be used for the OTP CIDs 40 of the remaining customers can be reset to their starting or default value (e.g., the all-0s value). The new customer certificates 26 issued to these customers would then be based on the updated value for the CCID version number 46, and each would include an appropriately updated value for the CERT CID 30.

Returning to Step 136, if the CERT version number 52 is found to be equal to the current manufacturing (programming) value of the CCID version number 46 (Yes from Step 136), then processing continues with additional evaluation checks. For example, assuming that the maximum possible OTP value is taken as a "revocation" value, Step 138 checks whether the current value for the OTP CID 40 of the customer (as pointed to by the CERT index value 32) is set to the maximum value. If so, the customer certificate 26 is already revoked. If not, processing continues with determining whether the current value for the OTP CID 40 of the customer is greater than the CERT CID 30 from the customer's certificate 26 (Step 140).

If the current value for the OTP CID 40 is greater than the CERT CID 30, the chipset 10 deems the customer certificate as already revoked. If the "No" path is taken from Step 140, then steps must be taken to ensure that the CCID 22 programmed into subsequently manufactured/programmed chipsets 10 will detect this particular customer's certificate as being revoked. To that end, processing continues in Step 142 with the manufacturer's computer system creating a new CCID 22. The new CCID value depends on updating the manufacturing value of the OTP CID 40 corresponding to the customer, to produce a "No" from Step 120 in the chipset processing flow of FIG. 5.

As such, in Step 142, the current programming value used for the OTP CID 40 for this particular customer is incremented to a value that is one greater than the value of the CERT CID 30, as currently set in the customer's certificate 26. Therefore, any subsequently manufactured chipset 10—and any existing chipsets 10 that are updated to include the newly set OTP bits 44—will carry an OTP CID 40 for the customer that will be greater than the CERT CID 30 for the customer. Notably, the current manufacturing values for the OTP CIDs 40 of the other chipset customers remain unchanged, meaning that the manipulations done for this particular customer do not affect the other customers.

Figure 7:
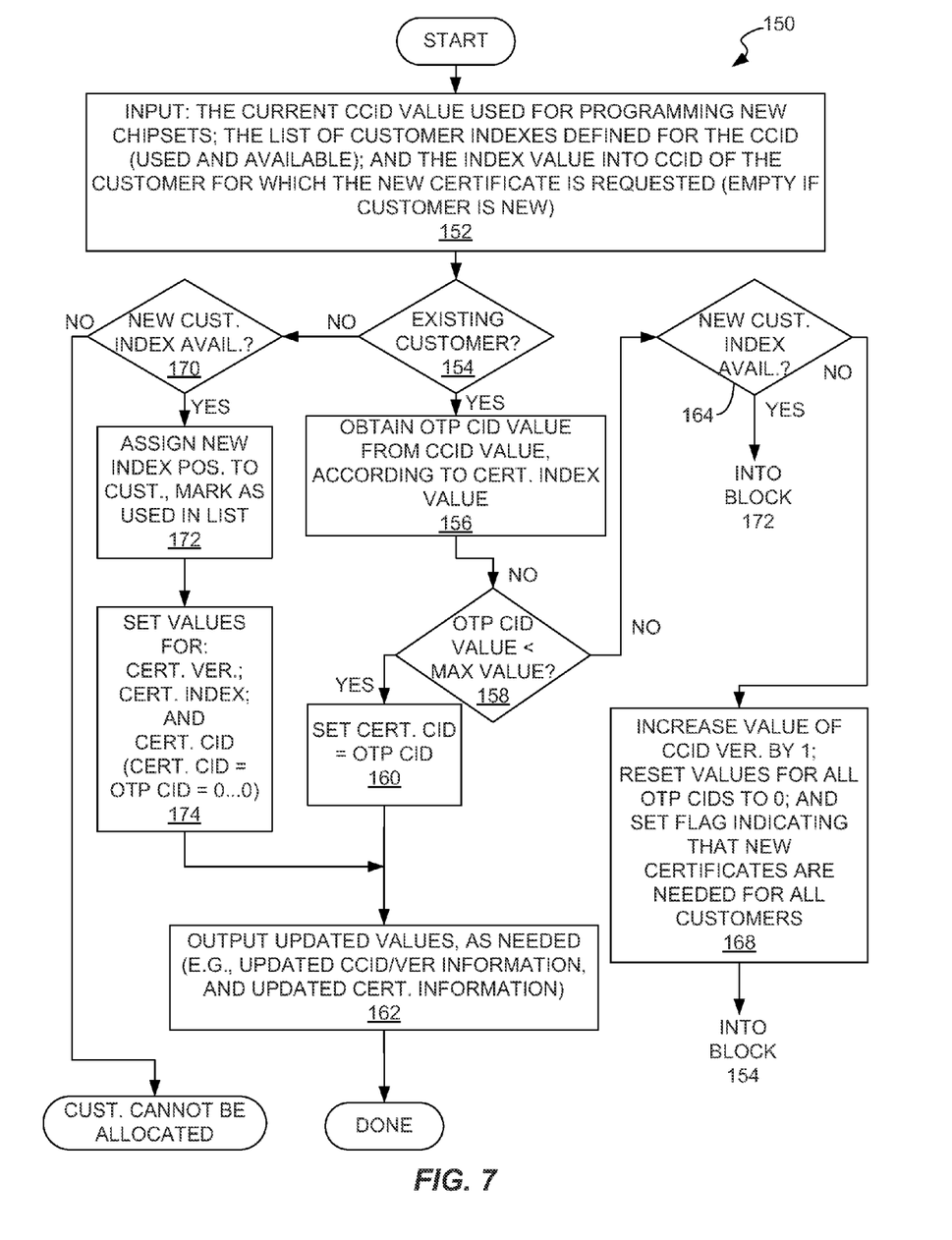
FIG. 7 is a logic flow diagram of an embodiment of a method implemented, e.g., by a chipset manufacturer's computer system, for issuing a new certificate for a customer for an existing chipset.

Continuing with manufacturer methods, FIG. 7 illustrates a method of assigning data for a new customer certificate 26. As with the method of FIG. 6, those skilled in the art will appreciate that the illustrated method 150 is carried out by the chipset manufacturer's computer system, for example. Further, one may assume that the processing flow of FIG. 6 has been run and that all old certificates have been revoked for the customer for which a new certificate is to be issued.

Processing begins with loading or otherwise obtaining as inputs the following items of data: the current programming value of the CCID 22 being used in manufacturing; a listing of used and available customer indexes (index positions 42) in the CCID 22; and the customer index of the customer for which a new certificate 26 is desired (Step 152).

If the customer is an existing customer (Yes from Step 154), processing continues with using the CERT index value 32 in the customer's certificate 26 to obtain the existing value of the customer's OTP CID 40 in the CCID 22 (Step 156). If the current value of the OTP CID 40 is less than the maximum permitted value (Yes from Step 158), then the value of the CERT CID 30 is set to the value of the OTP CID 40 (Step 160). (Note that first performing the process of FIG. 6 insures that, here, the CCID value is updated as compared to the one on which the customer's revoked certificate was based.) The CERT version is set equal to the CCID version (and CERT index value is unchanged). Processing then continues with outputting the updated data items, as needed (Step 162). For example, if entering Step 162 from Step 160, the manufacturing computer system outputs at least the updated value for the customer's CERT CID 30, and it may set a flag indicating that a new certificate 26 is to be generated for the customer, using the updated value for the CERT CID 30.

If the check of Step 158 results in a "No" result, meaning that the value of the OTP CID 40 used for the customer is at its maximum value, i.e., it cannot be updated due to the one-time-programmability of the OTP 14, then processing continues with determining whether a new customer index is available (Step 164). If so, then processing jumps to Step 172.

However, if there are no new customer indexes available ("No" from Step 164), which means there are no spare index positions 42 in the CCID 22, processing continues with Step 168. Here, an existing customer needs a new certificate 26 but the value of that customer's OTP CID 40 is already at its maximum, i.e., it cannot be incremented for issuance of a new certificate 26. Thus, the processing of Step 168 includes increasing the value of the CCID version number 46, e.g., by one. In conjunction with revising the CCID version number, the processing includes resetting the values for all OTP CIDs 40 to a starting value (e.g., the all-0s value), and setting a flag to indicate that new customer certificates 26 need to be generated for all customers of the chipset 10.

In other words, when a given existing customer exhausts the range of values available for the corresponding OTP CD 40 and there are no unused index positions in the CCID 22 which can be allocated to the customer, the CCID version number 46 is updated, all OTP CID values are reset and new certificates 26 must be issued to all customers. Thus, Step 168 may include setting such a flag, indicating the need for new customer certificates 26, and processing continues with jumping to Step 154.

Returning to Step 154, if the existing customer check indicates that a new customer is involved, processing continues with checking whether there is an available index position 42 in the CCID 22 (Step 170). If so, one of the available index positions 42 is assigned to the new customer, and that index position is marked as used in the manufacturing records associated with managing the CCID 22 and customer certificates 26 (Step 172), and processing continues (Step 174). In Step 174, the manufacturer's computer system generates the appropriate values needed to create a customer certificate 26 for the new customer—e.g., the correct CERT index value 32, CERT version number 52, and CERT CID 30. For example, as the new customer is starting off with a newly assigned OTP CID 40, the CERT CID 30 is set to the starting value used for OTP CIDs, e.g., the all-0s value. Although not explicitly shown, processing included in or performed subsequent to Step 174 may involve setting a flag, to trigger generation of a new customer certificate 26 for the new customer.

Of course, if there are no index positions available in the CCID 22, then new customers cannot be added. This circumstance is reflected in the "No" path from Step 170, wherein one sees that the new customer cannot be accommodated unless there is an index position available within the CCID 22 for use with the new customer.

With the above method embodiments in mind, it will be understood that the chipset manufacturer has, in one or more embodiments, a programmed computer system that implements a method of managing a plurality of customer certificates 26, each customer certificate 26 corresponding to a different customer, for enabling that customer to perform software booting of a given type of chipset 10. In other words, the plurality of customers are all consumers of a given type of chipset 10, and the chipset manufacturer manages customer certificates 26 to allow or disallow individual ones of the customers to use the chipsets 10, without affecting the other customers.

Figure 8:
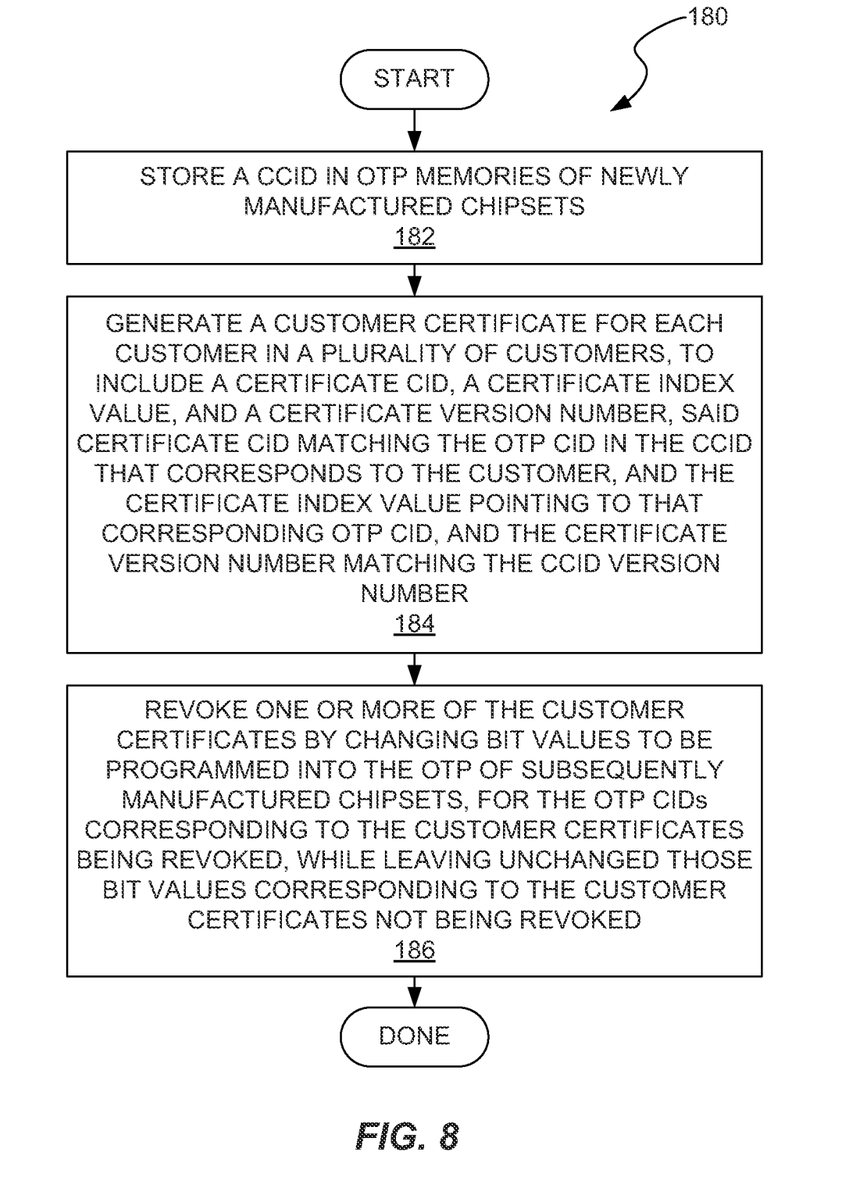
FIG. 8 is a logic flow diagram of an embodiment of a method implemented, e.g., by a chipset manufacturer's computer system, for generating and revoking customer certificates for individual customers all using a given type of chipset.

FIG. 8 depicts one embodiment of a method 180 that is implemented by the chipset manufacturer's computer system (s). The method 180 comprises storing a CCID 22 in OTP memories 14 of newly manufactured chipsets 10 of a given type (Step 182). As explained, the CCID 22 comprises a multi-bit value having an OTP CID 40 for each of the customers at a customer-specific index position 42 within the multi-bit value.

The method 180 further includes generating a customer certificate 26 for each customer (Step 184). Here, each customer certificate 26 includes a CERT CID 30 matching the corresponding OTP CID 40 in the CCID 22, and includes a CERT index value 32 pointing to that corresponding OTP CID 40 within the CCID 22. The method further includes (on an as needed basis) revoking one or more customer certificates 26 by changing bit values programmed into the OTP 14 of subsequently manufactured chipsets 10, for the OTP CIDs 40 corresponding to the customer certificates 26 being revoked, while leaving unchanged the bit values corresponding to the OTP CDs 40 of the customer certificates 26 not being revoked (Step 186).

For any given revoked certificates 26, the method 180 also may further include issuing a new certificate 26 having an updated CERT CID 30 matching the changed values programmed into the corresponding OTP CID 40 within the CCID 22. That is, the chipset manufacturer may update the OTP CID 40 for a given customer, to invalidate that customer's old certificate 26, and then issue a new certificate 26 having the value of its CERT CID 30 set to the value of the updated OTP CID 40.

As noted previously, owing to the one-time-programmability of bits 44 within the OTPs 14 of the chipsets 10, the OTP CID 40 of any given customer can be changed within the multi-value comprising the CCID 22 only a limited number of times, according to the number of bits comprising the CCID 22. In embodiments where a defined revocation value is used (such as the all 1s state), a given customer's OTP CID 40 takes on the defined revocation value once that limit is reached. Thus, the method 180 may further include issuing a new certificate 26 to a given customer, upon that customer's OTP CID 40 reaching the defined revocation value, by issuing the new certificate 26 with an updated CERT CID 30 that matches a spare OTP CID 40 included in the CCID 22 (at an unused index position 42). The new customer certificate 26 includes an updated CERT index value 32 that points to the spare OTP CID 40.

Further, the manufactured chipsets 10 may include a CCID version number 46. Thus, when the OTP CID 40 of any given customer reaches the defined revocation value, or otherwise reaches a value beyond which it cannot be further updated, the method 180 may further include resetting the OTP CIDs 40 for all customers to a defined starting value and correspondingly increasing the CCID version number. (As with the earlier use of "resetting," the act of resetting OTP CIDs 40 should be understood as logically resetting their values within the manufacturer's computer system, so that newly programmed chipsets 10 are written with CCIDs 22 having the reset OTP CIDs 40. As a general proposition, an OTP CID 40 cannot be reset once it is written into a given chipset 10—although it may be updated in a limited fashion, according to the type of OTP 14 being used.) The method 180 would then further include issuing new customer certificates 26 having the defined starting values (the reset OTP CIDs 40) for their respective CERT CIDs 30, and having a CERT version number 52 in each customer certificate 26 that is updated to the increased CCID version number 46.

Figure 9:
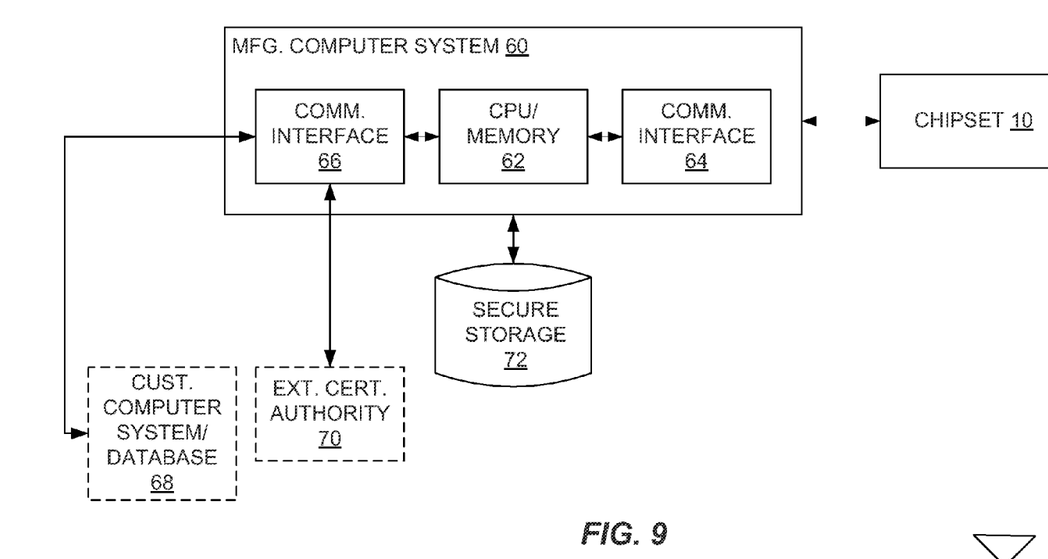
FIG. 9 is a block diagram of one embodiment of a chipset manufacturer's computer system, such as for implementing the method(s) of any of FIGS. 6, 7, and 8.

FIG. 9 illustrates a chipset manufacturer's computer system 60, such as may be programmed via software, to carry out the methods described immediately above. The illustrated computer system 60 includes a CPU/memory system 62 and an associated communication interface 64, for communicating with a chipset 10. (It will be appreciated that the actual implementation may provide parallel communications with a large plurality of chipsets 10.)

A further communication interface 66, such as a network interface, provides optional communications with a customer computer system/database 68, for securely exchanging certificates and other information. The communication interface 66 also may provide for secure communications with a third-party certificate authority 70 as, in some cases, the chipset manufacturer's computer system will cooperate with the computer systems of a third-party certificate authority 70 for issuance and revocation of certificates 26. The computer system 60 also includes or is associated with secure storage 72, for storing customer information associated with certificate management and CCID generation and maintenance.

Figure 10:
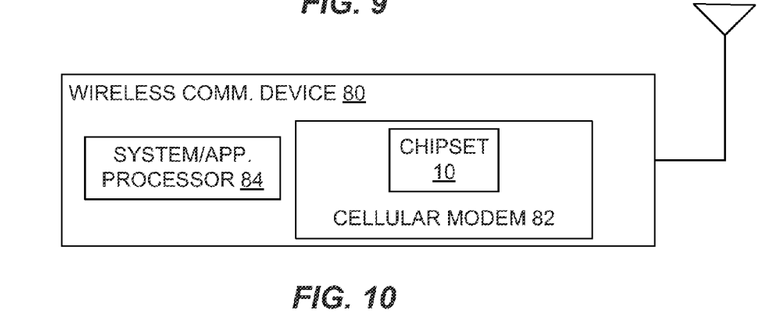
FIG. 10 is a block diagram of one embodiment of a wireless communication device using a chipset that is managed and configured according to the teachings presented herein.

Finally, FIG. 10 illustrates a simplified example of a wireless communication device 80, such as a cellular telephone, PDA, network card, etc. Here, the device 80 incorporates a cellular modem 82, featuring one of the manufactured chipsets 10. The device 80 also may include an additional "system" or "applications" processor 84, and various other circuits or functional elements, depending on its intended purpose and sophistication. Such details are not important to understanding that the methods and apparatus taught herein allow a chipset manufacturer to supply chipsets 10 for the manufacturer of such devices, in a manner that allows all customers of the chipset to be managed (in terms of certificate revocation) using a single, combined CCID 22 for all of them.

Advantageously, use of single CCID 22 still permits for individual (and, when needed, collective) certificate revocation. Further, the teachings herein allow individual customers to use both older and newer chipset versions securely and allows them to set OTP bits 44 within chipset OTPs 14, to prevent usage of those chipsets by competitors, etc. Of course, these are just example advantages and should be understood as non-limiting features of the present invention. Indeed, those skilled in the art will appreciate that the present invention is not limited by the foregoing examples, or by the accompanying drawings. Instead, the present invention is limited only by the following claims and their legal equivalents.

What is claimed is:

1. A method of validating a customer certificate used for enabling software booting of a chipset, said method comprising:
maintaining a software boot identification (CCID) in one-time-programmable (OTP) memory within the chipset, wherein the CCID comprises a multi-bit value having two or more CCID customer identifications (CIDs) contained at customer-specific index positions within the multi-bit value;
obtaining a certificate CID and a certificate index value from the customer certificate;
reading an OTP CID from the CCID by indexing into the CCID according to the certificate index value;
determining whether the customer certificate has or has not been revoked based on evaluating the OTP CID with the certificate CID; and
disallowing software booting of the chipset, if the customer certificate is determined as having been revoked.

2. The method of claim 1, wherein said step of reading the OTP CID includes reading a predefined number of bits from the CCID, at an index position corresponding to the certificate index value, according to a known bit length used for representing OTP CIDs within the CCID.

3. The method of claim 1, wherein said step of evaluating comprises determining whether the OTP CID equals a defined revocation value and, if so, deeming the customer certificate as being revoked.

4. The method of claim 3, wherein, if the OTP CID does not equal the defined revocation value, said step of evaluating further comprises deeming the customer certificate as not being revoked, if the certificate CID is greater than or equal to the OTP CID, and deeming the customer certificate as being revoked, if the certificate CID is less than the OTP CID.

5. The method of claim 1, further comprising maintaining a CCID version number in the OTP memory, and wherein said step of determining comprises deeming the customer certificate as being revoked, without need for said evaluating the OTP CID with the certificate CID, if a certificate version number stored in the customer certificate is less than the CCID version number.

6. The method of claim 5, further comprising deeming the customer certificate as not being revoked, without need for said evaluating the OTP CID with the certificate CID, if the certificate version number is greater than the CCID version number, and, if the certificate version number equals the CCID version number, said step of determining includes said evaluating the OTP CID with the certificate CID, wherein that evaluation includes deeming the customer certificate as not being revoked if the certificate CID is greater than or equal to the OTP CID.

7. A chipset comprising:
one-time-programmable (OTP) memory storing a software boot identification (CCID), wherein the CCID comprises a multi-bit value having two or more CCID customer identifications (CIDs) contained at customer-specific index positions within the multi-bit value; and
one or more processing circuits configured to:
obtain a certificate CID and a certificate index value from a customer certificate;
read an OTP CID from the CCID by indexing into the CCID according to the certificate index value;
determine whether the customer certificate has or has not been revoked based on evaluating the OTP CID with the certificate CID; and
disallow software booting of the chipset, if the customer certificate is determined as having been revoked.

8. The chipset of claim 7, wherein said chipset is configured to read the OTP CID based on reading a predefined number of bits from the CCID, at an index position corresponding to the certificate index value, according to a known bit length used for representing OTP CIDs within the CCID.

9. The chipset of claim 7, wherein said chipset evaluates the OTP CID with the certificate CID by determining whether the OTP CID equals a defined revocation value and, if so, deeming the customer certificate to have been revoked.

10. The chipset of claim 9, wherein, if the OTP CID does not equal the defined revocation value, the chipset is configured to deem the customer certificate as not being revoked, if the certificate CID is greater than or equal to the OTP CID, and deem the customer certificate as being revoked, if the certificate CID is less than the OTP CID.

11. The chipset of claim 7, wherein the chipset further includes a CCID version number stored in the OTP memory, and wherein the chipset is configured to deem the customer certificate as being revoked, without need for evaluating the OTP CID with the certificate CID, if a certificate version number stored in the customer certificate is less than the CCID version number.

12. The chipset of claim 11, wherein the chipset is configured to deem the customer certificate as not being revoked, without need for evaluating the OTP CID with the certificate CID, if the certificate version number is greater than the CCID version number, and if the certificate version number equals the CCID version number, the chipset is configured to evaluate the CCID with the certificate CID and deem the certificate as being revoked if the certificate CID is less than the OTP CID.

13. A method of managing a plurality of customer certificates, each customer certificate corresponding to a different customer, for enabling that customer to perform software booting of a given type of chipset, said method comprising:
storing a software boot identification (CCID) in one-time-programmable (OTP) memories of newly manufactured chipsets of a given type, said CCID comprising a multi-bit value having a CCID customer identification (CID) for each of the customers at a customer-specific index position within the multi-bit value;
generating a customer certificate for each customer, each customer certificate including a certificate CID matching the corresponding OTP CID in the CCID, and including an index value pointing to the corresponding OTP CID within the CCID; and
revoking one or more of the customer certificates by changing bit values programmed into the OTP of subsequently manufactured chipsets, for the OTP CIDs in the CCID that correspond to the customer certificates being revoked, while leaving unchanged those bit values programmed into the OTP for the OTP CIDs in the CCID that correspond to the customer certificates not being revoked.

14. The method of claim 13, further comprising, for any given revoked certificates, issuing a new certificate having an updated certificate CID matching the changed values programmed into the corresponding OTP CID within the CCID.

15. The method of claim 13, wherein the OTP CID of any given customer can be changed within the multi-bit value comprising the CCID only a limited number of times, according to the number of bits comprising the CCID, and takes on a defined revocation value once that limit is reached, and wherein the method further comprises issuing a new certificate to a given customer whose OTP CID has reached the defined revocation value by issuing the new certificate with an updated certificate CID that matches a spare OTP CID included in the CCID, and with an updated index value that points to the spare OTP CID.

16. The method of claim 13, wherein the manufactured chipsets further include a CCID version number, and wherein the given OTP CID of any given customer can be changed within the multi-bit value comprising the CCID only a limited number of times, according to the number of bits comprising the given OTP CID, and takes on a defined revocation value once that limit is reached, and wherein the method further comprises, upon reaching the defined revocation value for any given CCID, resetting the OTP CIDs for all customers to a defined starting value and correspondingly increasing the CCID version number, and issuing new customer certificates having the defined starting value for their respective certificate CIDs and having a certificate version number in each customer certificate updated to the increased CCID version number.

* * * * *